US011667820B2

(12) United States Patent
Lee et al.

(10) Patent No.: US 11,667,820 B2
(45) Date of Patent: Jun. 6, 2023

(54) ADHESIVE COMPOSITION FOR POLARIZING PLATE, POLARIZING PLATE, AND OPTICAL DISPLAY DEVICE

(71) Applicant: SAMSUNG SDI CO., LTD., Yongin-si (KR)

(72) Inventors: Seung Hoon Lee, Suwon-si (KR); Do Heon Lee, Suwon-si (KR); Mi Ran Seo, Suwon-si (KR); In Cheon Han, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 999 days.

(21) Appl. No.: 16/468,651

(22) PCT Filed: Sep. 11, 2017

(86) PCT No.: PCT/KR2017/009929
§ 371 (c)(1),
(2) Date: Jun. 11, 2019

(87) PCT Pub. No.: WO2018/110801
PCT Pub. Date: Jun. 21, 2018

(65) Prior Publication Data
US 2020/0071577 A1 Mar. 5, 2020

(30) Foreign Application Priority Data
Dec. 13, 2016 (KR) .......... 10-2016-0169981

(51) Int. Cl.
| | | |
|---|---|---|
| *C09J 163/00* | (2006.01) | |
| *B32B 7/12* | (2006.01) | |
| *B41J 2/16* | (2006.01) | |
| *C04B 37/00* | (2006.01) | |
| *C08F 2/46* | (2006.01) | |
| *C08F 2/50* | (2006.01) | |
| *C08G 61/04* | (2006.01) | |
| *C08F 220/18* | (2006.01) | |
| *C08F 236/02* | (2006.01) | |
| *C08G 59/24* | (2006.01) | |
| *C08G 65/26* | (2006.01) | |
| *C08J 3/28* | (2006.01) | |
| *C09J 133/08* | (2006.01) | |
| *C09J 147/00* | (2006.01) | |
| *G02B 5/30* | (2006.01) | |
| *G09F 9/30* | (2006.01) | |

(52) U.S. Cl.
CPC .......... *C09J 163/00* (2013.01); *C08F 220/18* (2013.01); *C08F 236/02* (2013.01); *C08G 59/24* (2013.01); *C08G 65/2612* (2013.01); *C08J 3/28* (2013.01); *C09J 133/08* (2013.01); *C09J 147/00* (2013.01); *G02B 5/30* (2013.01); *G09F 9/30* (2013.01); *C08F 220/1812* (2020.02)

(58) Field of Classification Search
CPC .......... G02B 5/30; G02B 5/3033; C08L 1/12; C08L 67/03; C08L 65/00; C08L 33/06; C08L 2205/05; C09J 163/00; C09J 133/08; C09J 4/06; C09J 5/00; C09J 147/00; C09J 151/08; C08G 59/24; C08G 59/68; C08G 65/2612; C08J 3/28; C08F 283/10; C08F 222/102; C08F 222/1812; C08F 220/18; C08F 236/02
USPC .......... 156/330, 327, 326, 325, 60, 1; 520/1; 522/6, 71, 189, 184, 1
See application file for complete search history.

(56) References Cited

U.S. PATENT DOCUMENTS

| | | | |
|---|---|---|---|
| 2010/0000670 A1 | 1/2010 | Kurimura et al. | |
| 2016/0280964 A1* | 9/2016 | Suwa | ............ C08F 222/10 |

FOREIGN PATENT DOCUMENTS

| | | | | |
|---|---|---|---|---|
| CN | 104419331 A | 3/2015 | | |
| CN | 105038622 A | 11/2015 | | |
| JP | 2008-233874 A | 10/2008 | | |
| KR | 10-2009-0078211 A | 7/2009 | | |
| KR | 10-2012-0030925 A | 3/2012 | | |
| KR | 10-2013-0020618 A | 2/2013 | | |
| KR | 10-2014-0054785 A | 5/2014 | | |
| KR | 10-2015-0042641 A | 4/2015 | | |
| KR | 10-2015-0114149 A | 10/2015 | | |
| WO | WO-2015072800 A1 * | 5/2015 | | ........... C08F 2/50 |

OTHER PUBLICATIONS

Chinese Office Action in corresponding Chinese Application No. 201780076764.0, Chinese Office Action dated Nov. 23, 2020 (13 pgs.).

Chinese Office Action in corresponding Chinese Application No. 201780076764.0, with English translation (6 pgs.), Chinese Office Action dated Nov. 23, 2020 (13 pgs.), previously submitted on Feb. 4, 2021.

* cited by examiner

*Primary Examiner* — Jessica Whiteley
(74) *Attorney, Agent, or Firm* — Lewis Roca Rothgerber Christie LLP

(57) ABSTRACT

Provided are an adhesive composition for a polarizing plate, a polarizing plate, and an optical display device, the adhesive composition comprising an epoxy-based compound, a (meth)acrylate-based compound, a photo-acid generator, and an optical radical initiator, the (meth)acrylate-based compound comprising a mixture of a bifunctional (meth)acrylate-based compound and a monofunctional (meth)acrylate-based compound having a hydrophobic functional group, wherein the adhesive strength measured after the adhesive composition for a polarizing plate is separately applied to a PET film, a TAC film, and a COP film, to which a polarizer is then bound, followed by photo-curing, is about 200 gf/inch or more.

14 Claims, No Drawings

1 …

ADHESIVE COMPOSITION FOR POLARIZING PLATE, POLARIZING PLATE, AND OPTICAL DISPLAY DEVICE

CROSS-REFERENCE TO RELATED APPLICATION(S)

This application is a U.S. National Phase Patent Application of International Application Number PCT/KR2017/009929, filed on Sep. 11, 2017, which claims priority of Korean Patent Application Number 10-2016-0169981, filed on Dec. 13, 2016, the entire contents of all of which are incorporated herein by reference.

TECHNICAL FIELD

The present invention relates to an adhesive composition for polarizing plates, a polarizing plate and an optical display. More particularly, the present invention relates to a photo-curable adhesive composition for polarizing plates, a polarizing plate, and an optical display.

BACKGROUND ART

A liquid crystal display includes a liquid crystal panel and polarizing plates disposed on both surfaces of the liquid crystal panel. The polarizing plate includes a polarizer and protective films on both surfaces of the polarizer. Recently, the polarizing plate includes a protective film on one surface of the polarizer and a coating layer on the other surface of the polarizer in order to reduce the thickness thereof.

Since an adhesive for polarizing plates is required to impart adhesion between a polyvinyl alcohol (PVA) film and a cellulose protective film, hydrophilic and water-soluble PVA adhesives are broadly used in the art. A polarizing plate using a water-based adhesive can undergo dimensional change due to heat from a backlight unit, and distortion caused by the dimensional change is localized in a region on a screen. As a result, there can be a problem of partially significant light leakage (spots) when the entirety of the screen is required to display black. Thus, a cation polymerizable UV-curable adhesive is suggested instead of the water-based adhesive (see Japanese Unexamined Patent Publication No. 2008-233874).

Since the cation polymerizable UV-curable adhesive undergoes dark reaction (post-polymerization) after irradiation with UV light, there is a problem of easy curling when a cured product of the adhesive is stored in the form of a roll. Moreover, the cation polymerizable UV-curable adhesive is vulnerable to moisture upon curing and can suffer deviation of a cured state. Therefore, in order to realize a uniform cured state, it is necessary to maintain strict control not only on environmental humidity but also on the water content of a PVA-based polarizer.

A radical polymerizable UV curable adhesive suffers less from such problems. A polarizing plate using the radical polymerizable UV curable adhesive can suffer from deterioration in polarization efficiency when exposed to moist heat conditions for a long time and light leakage can occur at a cut end of the polarizer dyed with iodine or dyes. Moreover, the polarizer can suffer from severe light leakage under severer conditions than the moist heat conditions (for example, dipping in warm water having a temperature of 60° C.). That is, there is a need for a polarizing plate which has better moist heat resistance than a typical polarizing plate under severe use conditions. Furthermore, an adhesive composition containing both a radical polymerizable (meth) acrylic compound and a cation polymerizable compound is suggested to achieve convenient bonding between a polyvinyl alcohol film and a plastic film with sufficient adhesive strength (see Japanese Unexamined Patent Publication No. 2008-260879).

DISCLOSURE

Technical Problem

It is an object of the present invention to provide an adhesive composition for polarizing plates that can suppress generation of cracks in a polarizer due to thermal impact.

It is another object of the present invention to provide an adhesive composition for polarizing plates that can prevent breakage due to brittleness.

It is a further object of the present invention to provide an adhesive composition for polarizing plates that exhibits good adhesive strength with respect to optical films for polarizers having different water vapor permeability.

It is yet another object of the present invention to provide an adhesive composition for polarizing plates that exhibits good adhesive strength with respect to each of a PET film, a COP film and a TAC film, to which a polarizer is bonded through an adhesive layer formed of the adhesive composition.

It is yet another object of the present invention to provide an adhesive composition for polarizing plates that can be easily deposited to realize a thin adhesive layer.

It is yet another object of the present invention to provide an adhesive composition for polarizing plates that can secure good cuttability.

Technical Solution

In accordance with one aspect of the present invention, there is provided an adhesive composition for polarizing plates, including an epoxy compound, a (meth)acrylate compound, and a photoinitiator, wherein the (meth)acrylate compound includes a mixture of a bifunctional (meth)acrylate compound and a monofunctional (meth)acrylate compound having a hydrophobic functional group, and the adhesive composition has an adhesive strength of about 200 gf/inch or more, as measured after depositing the adhesive composition onto each of a polyethylene terephthalate (PET) film, a triacetylcellulose (TAC) film, and a cycloolefin polymer (COP) film, and bonding a polarizer thereto, followed by photo-curing.

In accordance with another aspect of the present invention, there is provided a polarizing plate including an adhesive layer formed of the adhesive composition for polarizing plates according to the present invention.

In accordance with a further aspect of the present invention, there is provided an optical display including the polarizing plate according to the present invention.

Advantageous Effects

The adhesive composition for polarizing plates according to the present invention can suppress generation of cracks in a polarizer due to thermal impact, can prevent breakage due to brittleness, and can exhibit good adhesive strength with respect to optical films for polarizers having different water vapor permeability. In addition, the adhesive composition for polarizing plates according to the present invention can exhibit good adhesive strength with respect to each of a PET film, a COP film and a TAC film, to which a polarizer is bonded through an adhesive layer formed of the adhesive composition, can be easily deposited to realize a thin adhesive layer, and can secure good cuttability.

BEST MODE

Embodiments of the present invention will be described in detail with reference to the accompanying drawings. It should be understood that the present invention is not limited to the following embodiments and can be embodied in different ways. The following embodiments are provided to provide complete disclosure of the invention and thorough understanding of the present invention to those skilled in the art.

Herein, "water-vapor permeability" of an optical film is a value measured at 40° C. and 90% relative humidity (RH) in accordance with KS A1013.

Herein, the term "optical film" refers to a film stacked on a polarizer via an adhesive layer and includes a protective film, a non-stretched film providing no phase retardation, or a stretched film providing a certain range of phase retardation.

Herein, "adhesive strength" can be measured after depositing an adhesive composition for polarizing plates onto each of a polyethylene terephthalate (PET) film, a triacetylcellulose (TAC) film, and a cycloolefin polymer (COP) film, and bonding a polarizer thereto, followed by curing. Here, the polarizer may be a polarizer (thickness: 23 μm) fabricated by dyeing a 60 μm thick polyvinyl alcohol film (saponification degree: 99.5, polymerization degree: 2,000) in a 0.3% iodine aqueous solution, stretching the dyed film to 5.7 times an initial length thereof, and dipping the stretched film in a 3% boric acid solution and a 2% potassium iodide aqueous solution for color correction, followed by drying at 50° C. for 4 minutes. The PET film may be a typical polyethylene terephthalate film, preferably an 80 μm thick PET film (primer treated, TOYOBO Co., Ltd.). The TAC film may be a typical triacetylcellulose film, preferably a 40 μm thick TAC film with zero retardation (KONICA Co., Ltd.). The COP film may be a typical cycloolefin polymer film, preferably a 52 μm COP film (ZEONE, Zeon Co., Ltd.). For measurement of adhesive strength, a polarizing plate is fabricated by depositing an adhesive composition to a thickness of 1 μm to 4 μm on one surface of each of the PET film, the TAC film, and the COP film (subjected to corona treatment for a film not subjected to primer treatment) and bonding a polarizer thereto, followed by photo-curing under conditions of UVA: 1000 mJ/cm$^2$ and UVB: 400 mW/cm$^2$. The fabricated polarizing plate is cut to a size of 100 mm×25 mm, and a cutter is inserted into a gap between a corresponding optical film and the polarizer at one end of the polarizing plate to separate the optical film from the polarizer. Then, with both ends of each of the optical film and the polarizer secured to both sides of a UTM (TA XT Plus, Texture Technologies), adhesive strength between the optical film and the polarizer is measured by a 90° peeling method in which the other ends of the optical film and the polarizer are pulled at a rate of 300 mm/min in opposite directions.

Herein, the term "glass transition temperature (Tg) in a homopolymer phase" can mean a glass transition temperature measured with respect to a homopolymer of a target monomer using a DSC Discovery (TA Instrument Inc.). Specifically, the homopolymer of the target monomer is heated to 400° C. at a heating rate of 20° C./min, cooled to −80° C. at the same rate as the heating rate, and heated to about 40° C. at a rate of 10° C./min in order to obtain an endothermic transition curve. An inflection point of the endothermic transition curve can be determined as the glass transition temperature.

Herein, "modulus" of an adhesive layer refers to storage modulus thereof and is a value measured with respect to the adhesive layer. For measurement of modulus, a 10 μm thick adhesive film is prepared by coating an adhesive composition on a release film (for example, a polyethylene terephthalate film), followed by photo-curing under conditions of 23° C. and 55% RH, and is cut into a specimen having a size of 100 mm×7 mm×10 μm (length×width×thickness). Then, the modulus of the specimen is measured using a temperature sweep testing method (strain 0.04%, Preload force: 0.05N, Force Track: 125%, Frequency: 1 Hz) while heating the specimen from 20° C. to 140° C. at a heating rate of 5° C./min using a DMA Q800 (TA instrument Inc.). Herein, the modulus of the specimen measured at 85° C. is used as the modulus of the adhesive layer.

Herein, the term "(meth)acryl" refers to acryl and/or methacryl.

Hereinafter, an adhesive composition for polarizing plates according to one embodiment of the present invention will be described.

The adhesive composition according to this embodiment includes an epoxy compound, a (meth)acrylate compound, and a photoinitiator, wherein the (meth)acrylate compound may include a mixture of a bifunctional (meth)acrylate compound and a monofunctional (meth)acrylate compound having a hydrophobic functional group.

The epoxy compound may be present in an amount of about 50 parts by weight to about 90 parts by weight relative to 100 parts by weight of the epoxy compound and the (meth)acrylate compound. Within this range of the epoxy compound, the adhesive composition can suppress deterioration in cuttability and generation of cracks due to thermal impact by preventing embrittlement of an adhesive layer formed of the adhesive composition, and can improve wettability with respect to an optical film by preventing increase in viscosity of the adhesive composition. For example, the epoxy compound may be present in an amount of about 50 parts by weight to about 85 parts by weight, specifically about 60 parts by weight to about 85 parts by weight.

The epoxy compound may include a bifunctional alicyclic epoxy compound.

The bifunctional alicyclic epoxy compound can be polymerized by cations initiated by light energy. The bifunctional alicyclic epoxy compound has a high glass transition temperature in a homopolymer phase to improve durability by supporting a stacked structure of a polarizer, an adhesive layer and an optical film, and can improve interfacial adhesion between the polarizer and the optical film by securing chemical reaction and good wettability by hydroxyl groups generated upon reaction. The bifunctional alicyclic epoxy compound may have a glass transition temperature of about 150° C. or more, for example about 150° C. to about 400° C., in a homopolymer phase. Within this range, the adhesive composition can improve durability and interfacial adhesion between the polarizer and the optical film, and can prevent generation of cracks in the polarizer upon thermal impact.

The bifunctional alicyclic epoxy compound is a compound having two alicyclic epoxy groups. The alicyclic epoxy group means an epoxylated $C_3$ to $C_{20}$ alicyclic group, a $C_2$ to $C_{20}$ alicyclic group containing an epoxylated $C_3$ to $C_{20}$ alicyclic group, or a $C_1$ to $C_{10}$ alkyl group containing an epoxylated $C_3$ to $C_{20}$ alicyclic group. Specifically, the alicyclic epoxy group includes at least one of an epoxy cyclohexyl group, an epoxy cyclopentyl group, and a glycidyl group.

In one embodiment, the bifunctional alicyclic epoxy compound may include epoxycyclohexylmethyl epoxycyclohexane carboxylate, alkane diol epoxycyclohexane carboxylate, dicarboxylic acid-epoxycyclohexylmethyl ester, polyethylene glycol epoxycyclohexylmethyl ether, alkane diols epoxycyclohexylmethyl ether, diepoxytrispiro, diepoxymonospiro, vinylcyclohexene diepoxide, epoxycyclopentane ether, and diepoxy tricyclodecane compounds.

The bifunctional alicyclic epoxy compound may include at least one of 3,4-epoxycyclohexylmethyl-3',4'-epoxycyclohexane carboxylate, 3,4-epoxy-6-methylcyclohexylmethyl-3',4'-epoxy-6'-methylcyclohexanecarboxylate, bis(3,4-epoxy-6-methylcyclohexyl)adipate, and ε-caprolactone-modified 3,4-epoxycyclohexylmethyl-3',4'-epoxycyclohexanecarboxylate. For example, the bifunctional alicyclic epoxy compound may include CELLOXIDE 2021P (Diacel Co., Ltd.) and CELLOXIDE 8000 (Diacel Co., Ltd.), without being limited thereto.

The bifunctional alicyclic epoxy compound may be present in an amount of about 40 parts by weight to about 100 parts by weight relative to 100 parts by weight of the epoxy compound. Within this range, the adhesive composition can improve interfacial adhesion between the polarizer and the optical film. The bifunctional alicyclic epoxy compound may be present in an amount of about 50 parts by weight to about 90 parts by weight, specifically about 50 parts by weight to about 85 parts by weight, for example, about 60 parts by weight to about 85 parts by weight, relative to 100 parts by weight of the epoxy compound and the (meth)acrylate compound. Within this range, the adhesive composition can improve interfacial adhesion between the polarizer and the optical film.

The alicyclic epoxy compound may further include a monofunctional alicyclic epoxy compound and a tri- or higher functional alicyclic epoxy compound.

The epoxy compound may further include a monofunctional aromatic epoxy compound.

The monofunctional aromatic epoxy compound can prevent rapid increase in viscosity and reaction speed of the adhesive composition due to the bifunctional alicyclic epoxy compound.

The monofunctional aromatic epoxy compound may include at least one of phenyl glycidyl ether, cresyl glycidyl ether, and nonyl phenyl glycidyl ether.

The monofunctional aromatic epoxy compound may be present in an amount of about 20 parts by weight or less, for example, about 10 parts by weight or less, relative to 100 parts by weight of the epoxy compound. Within this range, the monofunctional aromatic epoxy compound can decrease in viscosity of the adhesive composition.

When the adhesive composition includes the epoxy compound alone or an excess of the epoxy compound, the adhesive composition has too high viscosity and is difficult to deposit, thereby making it difficult to form a thin adhesive layer. Moreover, the adhesive composition insignificantly suppresses generation of cracks in the polarizer due to thermal impact or has excessively high modulus at high temperature to form a brittle adhesive layer, which can be easily broken.

As such, according to the present invention, the adhesive composition for polarizing plates includes about 50 parts by weight or more, for example, about 60 parts by weight of the epoxy compound having a high glass transition temperature in a homopolymer phase and high viscosity at 25° C., particularly, the bifunctional alicyclic epoxy compound, and further includes the bifunctional (meth)acrylate compound and the monofunctional (meth)acrylate compound having a hydrophobic functional group (hereinafter, referred to as "monofunctional (meth)acrylate compound"). With these components, the adhesive composition for polarizing plates can further improve reaction speed, prevent generation of cracks in the polarizer due to thermal impact, exhibit good adhesive strength with respect to all of optical films having different water vapor permeability, and prevent embrittlement of an adhesive layer at high temperature. A polarizing plate including the adhesive layer formed of the adhesive composition for polarizing plates according to the present invention may have a maximum crack length of about 10 mm or less, specifically about 0.1 mm to about 9 mm, for example, about 0.1 mm to about 5 mm, in an absorption axis of the polarizer (generally in the MD (machine direction)) upon thermal impact. Within this range, the adhesive composition can suppress generation of cracks in the polarizer upon thermal impact, thereby improving reliability of the polarizing plate.

Specifically, a cured product of the adhesive composition may have a modulus at 85° C. of about 500 MPa to less than about 2,000 MPa, for example, about 500 MPa to about 1500 MPa. Within this range of modulus, the adhesive composition can prevent generation of cracks in the polarizer due to thermal impact and embrittlement of the adhesive layer. In addition, the cured product of the adhesive composition may have a maximum post-curing tanδ (tanδ$_{max}$) of about 0.5 to about 1, for example, about 0.5 to about 0.8. The cured product of the adhesive composition may have a glass transition temperature of about 90° C. to about 140° C., for example, about 110° C. to about 130° C. Within this range, the adhesive composition can prevent generation of cracks in the polarizer due to thermal impact and can secure suitable modulus at high temperature to prevent embrittlement of the adhesive layer.

Specifically, the cured product of the adhesive composition may have an adhesive strength of about 200 gf/inch or more with respect to all of optical films having different water vapor permeability. For example, the cured product of the adhesive composition can exhibit good adhesive strength with respect to all of optical films having different water vapor permeability in a wide range of about 0 g/m$^2$·day to about 2000 g/m$^2$·day. The optical films may include a PET film (for example, water vapor permeability of about 0 g/m$^2$·day to about 50 g/m$^2$·day), a COP film (for example, water vapor permeability of about 0 g/m$^2$·day to about 10 g/m$^2$·day), and a TAC film (for example, water vapor permeability of about 600 g/m$^2$·day to about 1,200 g/m$^2$·day). Preferably, the cured product of the adhesive composition has an adhesive strength of about 200 gf/inch to about 1,500 gf/inch.

In one embodiment, the adhesive composition may exhibit an adhesive strength of about 650 gf/inch to about 1,500 gf/inch with respect to the PET film.

In another embodiment, the adhesive composition may exhibit an adhesive strength of about 300 gf/inch to about 550 gf/inch with respect to the TAC film.

In a further embodiment, the adhesive composition may exhibit an adhesive strength of about 200 gf/inch to about 350 gf/inch with respect to the COP film.

The (meth)acrylate compound (the total amount of the bifunctional (meth)acrylate compound and the monofunctional (meth)acrylate compound) may be present in an amount of about 10 parts by weight to about 50 parts by weight, specifically about 15 parts by weight to about 50 parts by weight, for example, about 15 parts by weight to about 40 parts by weight, relative to 100 parts by weight of the epoxy compound and the (meth)acrylate compound. Within this range of the (meth)acrylate compound, the adhesive composition can exhibit good adhesive strength with respect to the TAC film, the PET film and the COP film while improving initial curing rate.

The bifunctional (meth)acrylate compound is polymerized by radicals initiated by light energy. The bifunctional (meth)acrylate compound does not deteriorate curing reaction by moisture and can stably react by light without obstructing reaction by moisture within the polarizer. Furthermore, the bifunctional (meth)acrylate compound can stably form an adhesive layer due to a higher reaction rate than the monofunctional (meth)acrylate compound, thereby compensating for reduction in curing rate due to relative reduction in the epoxy compound.

Particularly, the bifunctional (meth)acrylate compound may be a mono(alkylene glycol) or poly(alkylene glycol) bifunctional (meth)acrylate compound. These compounds have a viscosity of about 30 cps or less at 25° C. and can reduce viscosity of the adhesive composition at 25° C., thereby providing advantageous conditions for formation of a thin adhesive layer. In addition, these compounds have a glass transition temperature of about 30° C. or more, for example, about 30° C. to about 80° C., in a homopolymer phase, thereby suppressing generation of cracks in the polarizer due to thermal impact by increasing the glass transition temperature of the adhesive composition or the adhesive layer. Furthermore, these compounds have significantly high curing rates to allow the adhesive composition to exhibit good adhesive strength with respect to the polarizer and films having different water vapor permeability, such as a polyethylene terephthalate film, a triacetylcellulose film, and a cycloolefin polymer film. Thus, the adhesive composition for polarizing plates may have an adhesive strength of about 200 gf/inch or more, as measured by depositing the adhesive composition onto each of the PET film, the TAC film and the COP film, and bonding the polarizer thereto, followed by photo-curing.

Preferably, the bifunctional (meth)acrylate compound is a poly(alkylene glycol) bifunctional (meth)acrylate compound. For example, the bifunctional (meth)acrylate compound may include at least one selected from among di(propylene glycol) di(meth)acrylate, tri(propylene glycol) di(meth)acrylate, di(ethylene glycol) di(meth)acrylate, and tri(ethylene glycol) di(meth)acrylate. For example, the bifunctional (meth)acrylate compound may be hexanediol di(meth)acrylate, without being limited thereto.

The bifunctional (meth)acrylate compound may be present in an amount of about 10 parts by weight to about 30 parts by weight, for example, about 15 parts by weight to about 25 parts by weight, relative to 100 parts by weight of the epoxy compound and the (meth)acrylate compound. Within this range, the bifunctional (meth)acrylate compound can increase the curing rate of the adhesive composition and can improve durability of the adhesive layer.

The bifunctional (meth)acrylate compound may be present in an amount of about 50 parts by weight to about 90 parts by weight relative to 100 parts by weight of the (meth)acrylate compound. For example, the bifunctional (meth)acrylate compound may be present in an amount of about 60 parts by weight to about 90 parts by weight. Alternatively, the bifunctional (meth)acrylate compound may be present in an amount of about 60 parts by weight to about 80 parts by weight. Alternatively, the bifunctional (meth)acrylate compound may be present in an amount of about 62 parts by weight to about 75 parts by weight. Within this range, the bifunctional (meth)acrylate compound can increase the curing rate of the adhesive composition and can improve durability of the adhesive layer.

The monofunctional (meth)acrylate compound has a hydrophobic functional group at an ester site thereof and thus can prevent deterioration in adhesive strength of the adhesive layer to the optical film or the polarizer due to external moisture upon bonding the optical film to the polarizer with the adhesive composition for polarizing plates. Furthermore, in the adhesive composition for polarizing plates according to the present invention, the hydrophobic functional group can prevent increase in distribution of adhesive strength at an interface between the polarizer and the adhesive layer or between the optical film and the adhesive layer due to external moisture. Preferably, the hydrophobic functional group is a $C_{10}$ to $C_{20}$ linear or branched alkyl group. For example, the hydrophobic functional group may be a lauryl group, an isodecyl group, or the like. Specifically, the monofunctional (meth)acrylate compound may include lauryl (meth)acrylate (having a glass transition temperature of about −30° C. in a homopolymer phase) and isodecyl (meth)acrylate (having a glass transition temperature of about −60° C. in a homopolymer phase).

The monofunctional (meth)acrylate compound may have a glass transition temperature (Tg) of about 0° C. or less in a homopolymer phase. With the monofunctional (meth)acrylate compound having a glass transition temperature (Tg) of about 0° C. or less in a homopolymer phase, the adhesive composition can prevent generation of cracks in the polarizer due to thermal impact and can secure suitable modulus at high temperature to prevent embrittlement of the adhesive layer even when containing an excess of the epoxy compound having a high glass transition temperature in a homopolymer phase. Preferably, the monofunctional (meth)acrylate compound has a glass transition temperature of about −80° C. to about −10° C. in a homopolymer phase.

The monofunctional (meth)acrylate compound may be present in an amount of about 5 parts by weight to about 20 parts by weight, for example, about 9 parts by weight to about 15 parts by weight, relative to 100 parts by weight of the epoxy compound and the (meth)acrylate compound. Within this range, the adhesive composition can prevent deterioration in viscosity and can reduce distribution of adhesive strength of the adhesive layer.

The monofunctional (meth)acrylate compound may be present in an amount of about 10 parts by weight to about 50 parts by weight, for example, about 10 parts by weight to about 40 parts by weight, about 20 parts by weight to about 40 parts by weight, or about 25 parts by weight to about 38 parts by weight, relative to 100 parts by weight of the (meth)acrylate compound. Within this range, the adhesive composition can prevent deterioration in viscosity and reduce distribution of adhesive strength of the adhesive layer.

The photoinitiator may include at least one of a photo acid generator and a photo radical initiator.

The photo acid generator may include an onium salt containing a cation and an anion. Specifically, the cation may include: triarylsulfonium such as triphenylsulfonium, diphenyl-4-(phenylthio)phenyl sulfonium, and diphenyl-4-thiophenoxyphenylsulfonium, bis[4-(diphenylsulfonio)phenyl]sulfide, and the like. Specifically, the anion may include hexafluorophosphate ($PF_6^-$), tetrafluoroborate ($BF_4^-$), hexafluoroantimonate ($SbF_6^-$), hexafluoroarsenate ($AsF_6^-$), hexachloroantimonate ($SbCl_6^-$), and the like.

The photo acid generator may be present in an amount of about 1 part by weight to about 10 parts by weight, for example, about 1 part by weight to about 6 parts by weight, relative to 100 parts by weight of the epoxy compound and the (meth)acrylate compound. Within this range, the photo acid generator can sufficiently cure the epoxy compound without deterioration in adhesive strength, and can prevent deterioration in transparency of the adhesive layer or bleeding out of remaining photo acid generator.

The photo radical initiator can reduce the color coordinate bs value of the adhesive layer and can cure the (meth) acrylate compound, when used together with the photo acid generator. The photo radical initiator may be selected from any typical photo radical initiators well-known to those skilled in the art. Specifically, the photo radical initiator may include at least one of phosphorus, triazine, acetophenone, benzophenone, benzoin, and oxime photo radical initiators. The bs value refers to a color coordinate value obtained upon transmission of light having a predetermined wavelength to the polarizing plate. A polarizing plate including the adhesive layer formed of the adhesive composition for polarizing plates according to the present invention may have a color coordinate bs value of about 3 or less, for example, about 0 to about 2.8. Within this range, the polarizing plate can provide good visibility by preventing a yellow color from being viewed when used in an optical display.

The photo radical initiator may be present in an amount of about 0.5 parts by weight to about 10 parts by weight, for example, about 1 part by weight to about 7 parts by weight, relative to 100 parts by weight of the epoxy compound and the (meth)acrylate compound. Within this range, the photo radical initiator can sufficiently cure the (meth)acrylate compound and prevent deterioration in transparency of the adhesive layer or bleeding out of remaining photo radical initiator.

The adhesive composition for polarizing plates may include a solvent or may be a solvent-free adhesive composition. Use of the solvent-free adhesive composition can minimize influence of a solvent on an optical film.

The adhesive composition for polarizing plates may further include typical additives such as antioxidants, adhesion promoters, antistatic agents, leveling agents, antifoaming agents, UV absorbents, and the like in order to impart effects thereof to the adhesive composition.

The adhesive composition for polarizing plates may have a viscosity at 25° C. of about 20 cP to about 100 cP. Within this range, the adhesive composition can be easily deposited.

Next, a polarizing plate according to one embodiment of the invention will be described.

The polarizing plate includes a polarizer and an optical film on at least one surface of the polarizer, wherein the optical film may be bonded to the polarizer via an adhesive layer formed of the adhesive composition according to the present invention.

The polarizer can polarize light entering the polarizing plate. The polarizer may be a polyvinyl alcohol-based polarizer formed of a polyvinyl alcohol film. In one embodiment, the polarizer may be formed by adsorbing at least one of iodine and dichroic dyes to the polyvinyl alcohol film. In another embodiment, the polarizer may be a polyene-based polarizer obtained by dehydrating a polyvinyl alcohol film. The polarizer may have a thickness of about 5 μm to about 100 μm, specifically about 5 μm to about 50 μm. Within this thickness range, the polarizer can be used in the polarizing plate.

The optical film may be formed on one or both surfaces of the polarizer to protect the polarizer.

The optical film may include at least one film selected from among cellulose resins such as triacetylcellulose, polyester resins such as polyethylene terephthalate, polybutylene terephthalate, polyethylene naphthalate, polybutylene naphthalate, and the like, cyclic polyolefin resins such as amorphous cyclic olefin polymer (COP) and the like, polycarbonate resins, polyether sulfone resins, polysulfone resins, polyamide resins, polyimide resins, non-cyclic polyolefin resins, polyacrylate resins such as poly(methyl methacrylate), polyvinyl alcohol resins, polyvinyl chloride resins, and polyvinylidene chloride resins. The optical film may have a thickness of about 5 μm to about 200 μm, specifically about 10 μm to about 150 μm, more specifically about 50 μm to about 120 μm. Within this thickness range, the optical film can be used in the polarizing plate.

The adhesive composition for polarizing plates according to the present invention may be a photo-curable composition. Accordingly, an adhesive layer can be formed by depositing the adhesive composition onto an optical film and laminating the polarizer thereon, followed by photo-curing. The adhesive layer may have a thickness of about 10 μm or less, for example, about 1 μm to about 5 μm. Within this range, the adhesive layer can be used in the polarizing plate.

An optical display according to one embodiment may include the polarizing plate according to the embodiments of the present invention. The optical display may include the adhesive layer formed of the adhesive composition for polarizing plates. The optical display may be a liquid crystal display, without being limited thereto.

MODE FOR INVENTION

Next, the present invention will be described in more detail with reference to some examples. It should be understood that these examples are provided for illustration only and are not to be construed in any way as limiting the present invention.

Details of components used in Examples and Comparative Examples are as follows.

① Bifunctional alicyclic epoxy compound: cycloaliphatic diepoxide (CELLOXIDE 2021P, homopolymer Tg: 196° C., Daicel Co., Ltd.)

② Monofunctional aromatic epoxy compound: Phenyl glycidyl ether (EX-141, Nagase Co., Ltd.)

③ Bifunctional (meth)acrylate compound: Tri(propylene glycol) diacrylate (M-220, Miwon Specialty Chemical Co., Ltd.)

④ Monofunctional (meth)acrylate compound: Lauryl acrylate (M-120, homopolymer Tg: −30° C., Miwon Specialty Chemical Co., Ltd.) having a lauryl group as a hydrophobic functional group.

⑤ Photo acid generator: Diphenyl-4-(phenylthio)phenyl sulfonium hexafluorophosphate (CPI-100P, San-Apro Co., Ltd.)

⑥ Photo radical initiator: 1-hydroxy-cyclohexylphenylketone (Irgacure-184, BASF)

⑦ Monofunctional (meth)acrylate compound: 2-hydroxyethyl methacrylate (homopolymer Tg: about 57° C.) having a hydroxyethyl as a hydrophilic functional group.

EXAMPLE 1

An adhesive composition was prepared by mixing 70 parts by weight of the bifunctional alicyclic epoxy compound, 20 parts by weight of the bifunctional (meth)acrylate compound, 10 parts by weight of the monofunctional (meth)

acrylate compound, 2 parts by weight of the photo acid generator, and 1 part by weight of the photo radical initiator.

EXAMPLES 2 TO 4

Adhesive compositions were prepared in the same manner as in Example 1 except that the amounts of the bifunctional alicyclic epoxy compound, the monofunctional aromatic epoxy compound, the bifunctional (meth)acrylate compound, the monofunctional (meth)acrylate compound, the photo acid generator, and the photo radical initiator were changed as listed in Table 1 (unit: parts by weight).

COMPARATIVE EXAMPLES 1 TO 5

Adhesive compositions were prepared in the same manner as in Example 1 except that the amounts of the bifunctional alicyclic epoxy compound, the monofunctional aromatic epoxy compound, the bifunctional (meth)acrylate compound, the monofunctional (meth)acrylate compound, the photo acid generator, and the photo radical initiator were changed as listed in Table 1 (unit: parts by weight).

bonding the polarizer thereto, followed by photo-curing under conditions of UVA: 1000 mJ/cm² and UVB: 400 mW/cm². The fabricated polarizing plate was cut to a size of 100 mm×25 mm, and a cutter was inserted into a gap between the optical film and the polarizer at one end of the polarizing plate to separate the optical film from the polarizer. Then, with both ends of each of the optical film and the polarizer secured to both sides of a UTM (TA XT Plus, Texture Technologies), adhesive strength between the optical film and the polarizer was measured by a 90° peeling method in which the other ends of the optical film and the polarizer were pulled at a rate of 300 mm/min in opposite directions.

(2) Crack resistance: Crack resistance was evaluated under conditions of thermal impact to a polarizing plate. The polarizing plate was prepared in the same manner as in (1). A PET film was used as an optical film. A specimen was prepared by laminating the polarizing plate (50 mm×50 mm) onto a glass plate. Thermal impact was applied to the specimen by repeating 200 cycles of thermal impact testing, in which each cycle includes leaving the specimen at −40°

TABLE 1

| Kind (unit: parts by weight) | Epoxy based compound ① | Epoxy based compound ② | (Meth)acrylate based compound ③ | (Meth)acrylate based compound ④ | Photo acid generator ⑤ | photo radical initiator ⑥ | (Meth)acrylate based compound ⑦ |
|---|---|---|---|---|---|---|---|
| Example 1 | 70 | — | 20 | 10 | 2 | 1 | — |
| Example 2 | 65 | 5 | 20 | 10 | 2 | 1 | — |
| Example 3 | 60 | — | 25 | 15 | 2 | 1 | — |
| Example 4 | 70 | 3 | 18 | 9 | 2 | 1 | — |
| Comparative Example 1 | 100 | — | — | — | 2 | 1 | — |
| Comparative Example 2 | 90 | 10 | — | — | 2 | 1 | — |
| Comparative Example 3 | 70 | — | 30 | — | 2 | 1 | — |
| Comparative Example 4 | 70 | — | — | 30 | 2 | 1 | — |
| Comparative Example 5 | 70 | — | 20 | — | 2 | 1 | 10 |

The adhesive compositions of Examples and Comparative Examples were evaluated as to properties of Table 2 and results are shown in Table 2.

(1) Adhesive strength: A 23 μm thick polarizer was prepared by dipping a 60 μm thick polyvinyl alcohol film (saponification degree: 99.5, polymerization degree: 2,000) in a 0.3% iodine aqueous solution for dyeing, stretching the dyed film to 5.7 times an initial length thereof, and dipping the stretched film in a 3% boric acid solution and a 2% potassium iodide aqueous solution for color correction, followed by drying at 50° C. for 4 minutes.

As optical films, a PET film, a TAC film and a COP film were used. The PET film was an 80 μm thick PET film (primer treated, TA044, water vapor permeability: 10 g/m²·day, TOYOBO Co., Ltd.). The TAC film was a 40 μm thick TAC film with zero retardation (KC4CT1, water vapor permeability: 800 g/m²·day, KONICA Co., Ltd.). The COP film was a 52 μm COP film (ZEONE, water vapor permeability: 5 g/m²·day, Zeon Co., Ltd.).

For measurement of adhesive strength, a polarizing plate was fabricated by depositing an adhesive composition to a thickness of 1 μm to 4 μm on one surface of each of the PET film, the TAC film, and the COP film (subjected to corona treatment for a film not subjected to primer treatment) and C. for 30 minutes, heating the specimen from −40° C. to 85° C., and leaving the specimen at 85° C. for 30 minutes. Generation of cracks in the polarizer in the MD was observed with the naked eye in a reflection mode and a backlight mode under a fluorescent lamp. Among the cracks generated in the polarizer, the maximum crack length was evaluated.

(3) Optical characteristics (bs): A polarizing plate was prepared in the same manner as in (1). A PET film was used as an optical film. The polarizing plate was cut to a size of 3 cm×3 cm. With the PET film of the polarizing plate disposed to receive light emitted from a V-7100, the bs value was measured at a wavelength of 380 nm to 780 nm.

(4) Cuttability: A polarizing plate was punched to a size of 500 mm×500 mm from an optical film side using a cutter blade. A delaminated state at a punched end portion of the polarizing plate was observed with the naked eye. On the optical film of the polarizing plate, no delamination was rated as ⊚, a delamination length of 1 mm or less was rated as ◯, a delamination length of greater than 1 mm to 2 mm was rated as Δ, and a delamination length of greater than 2 mm was rated as X.

(5) Modulus: A 10 μm thick adhesive film was prepared by coating an adhesive composition onto a release film (for example, a polyethylene terephthalate film), followed by photo-curing under conditions of 23° C. and 55% RH, and was cut into a specimen having a size of 100 mm×7 mm×10 μm (length×width×thickness). Then, modulus at 85° C. was measured by a temperature sweep testing method (strain 0.04%, Preload force: 0.05N, Force Track: 125%, Frequency: 1 Hz) while heating the specimen from 20° C. to 140° C. at a heating rate of 5° C./min using a DMA Q800 (TA instrument Inc.).

(6) $\tan\delta_{max}$ and glass transition temperature (Tg): In measurement of modulus in Item (5), the maximum $\tan\delta$ was referred to as $\tan\delta_{max}$, and the temperature at which the maximum $\tan\delta$ was obtained was defined as the glass transition temperature.

TABLE 2

| Kind | Adhesive strength (gf/inch) | | | Crack resistance (mm) | Optical characteristics | Cuttability | Modulus (MPa, at 85° C.) | Tanδ max | Tg (° C.) |
|---|---|---|---|---|---|---|---|---|---|
| | PET film | TAC film | COP film | | | | | | |
| Example 1 | 1230 | 440 | 280 | 2.0 | 2.6 | ⊚ | 1100 | 0.7 | 130 |
| Example 2 | 880 | 390 | 270 | 2.5 | 2.5 | ○ | 1000 | 0.6 | 120 |
| Example 3 | 700 | 310 | 240 | 2.2 | 2.6 | ○ | 800 | 0.5 | 110 |
| Example 4 | 1120 | 470 | 300 | 0.8 | 2.4 | ⊚ | 1000 | 0.5 | 140 |
| Comparative Example 1 | 1020 | 290 | 180 | 8.8 | 2.5 | X | 2400 | 2.0 | 196 |
| Comparative Example 2 | 870 | 110 | 160 | 22.6 | 2.0 | X | 2000 | 1.5 | 170 |
| Comparative Example 3 | 550 | 250 | 120 | 18.8 | 4.6 | ○ | 700 | 0.7 | 100 |
| Comparative Example 4 | 790 | 320 | 150 | 19.0 | 3.5 | X | 1900 | 0.6 | 105 |
| Comparative Example 5 | 610 | 100 | 100 | 24.2 | 2.4 | X | 1200 | 1.3 | 150 |

As shown in Table 2, the adhesive compositions according to the present invention exhibited good adhesive strength with respect to all of optical films for polarizers having different water vapor permeability, suppressed generation of cracks in the polarizer due to thermal impact, prevented breakage of the adhesive layer due to brittleness, and provided good cuttability.

Conversely, the adhesive compositions of Comparative Examples 1 and 2, which included the epoxy compound alone, provided an insignificant effect of suppressing generation of cracks in the polarizer due to thermal impact, or had significantly high modulus at high temperature to form a brittle adhesive layer, which can be easily broken.

Moreover, the adhesive compositions of Comparative Examples 3 and 5, which included one of the bifunctional (meth)acrylate compound and the monofunctional (meth)acrylate compound having a hydrophobic functional group, or included the monofunctional (meth)acrylate compound having a hydrophilic functional group, exhibited insufficient adhesive strength with respect to optical films for polarizers having different water vapor permeability, and provided an insignificant effect of suppressing generation of cracks in the polarizer due to thermal impact.

It should be understood that various modifications, changes, alterations, and equivalent embodiments can be made by those skilled in the art without departing from the spirit and scope of the invention.

The invention claimed is:

1. An adhesive composition for polarizing plates, comprising an epoxy compound, a (meth)acrylate compound, and a photoinitiator, wherein the (meth)acrylate compound comprises a mixture of a bifunctional (meth)acrylate compound and a monofunctional (meth)acrylate compound having a hydrophobic functional group, and wherein the adhesive composition for polarizing plates has an adhesive strength of about 200 gf/inch or more, as measured after depositing the adhesive composition onto each of a polyethylene terephthalate (PET) film, a triacetylcellulose (TAC) film, and a cycloolefin polymer (COP) film, and bonding a polarizer thereto, followed by photo-curing, wherein the adhesive composition for polarizing plates is solvent-free and has a viscosity at 25° C. of about 20 cP to about 100 cP, and wherein the epoxy compound comprises a bifunctional alicyclic epoxy compound, and the bifunctional alicyclic epoxy compound is present in an amount of 50 parts by weight to about 90 parts by weight relative to 100 parts by weight of the epoxy compound and the (meth)acrylate compound.

2. The adhesive composition for polarizing plates according to claim 1, wherein the epoxy compound further comprises a monofunctional aromatic epoxy compound.

3. The adhesive composition for polarizing plates according to claim 1, wherein a photo-cured product of the adhesive composition has a modulus at 85° C. of about 500 MPa to less than about 2,000 MPa.

4. The adhesive composition for polarizing plates according to claim 1, wherein a photo-cured product of the adhesive composition has a maximum tanδ ($\tan\delta_{max}$) of about 0.5 to about 1.

5. The adhesive composition for polarizing plates according to claim 1, wherein a photo-cured product of the adhesive composition has a glass transition temperature of about 90° C. to about 140° C.

6. The adhesive composition for polarizing plates according to claim 1, wherein the bifunctional (meth)acrylate compound comprises a mono(alkylene glycol) or poly(alkylene glycol) bifunctional (meth)acrylate compound.

7. The adhesive composition for polarizing plates according to claim 1, wherein the bifunctional (meth)acrylate compound comprises at least one of di(propylene glycol) di(meth)acrylate, tri(propylene glycol) di(meth)acrylate, di(ethylene glycol) di(meth)acrylate, and tri(ethylene glycol) di(meth)acrylate.

8. The adhesive composition for polarizing plates according to claim 1, wherein the bifunctional (meth)acrylate compound is present in an amount of about 60 parts by weight to about 80 parts by weight relative to 100 parts by weight of the (meth)acrylate compound.

9. The adhesive composition for polarizing plates according to claim 1, wherein the monofunctional (meth)acrylate compound has a glass transition temperature (Tg) of about −80° C. to about −10° C. in a homopolymer phase.

10. The adhesive composition for polarizing plates according to claim 1, wherein the monofunctional (meth) acrylate compound comprises a $C_{10}$ to $C_{20}$ linear or branched hydrophobic alkyl group-containing monofunctional (meth)acrylate compound.

11. The adhesive composition for polarizing plates according to claim 1, wherein the monofunctional (meth) acrylate compound is present in an amount of about 10 parts by weight to about 40 parts by weight relative to 100 parts by weight of the (meth)acrylate compound.

12. A polarizing plate comprising a polarizer and an optical film formed on at least one surface of the polarizer, wherein the optical film is formed of the adhesive composition for polarizing plates according to claim 1.

13. The polarizing plate according to claim 12, wherein the polarizing plate has a color coordinate bs value of about 3 or less.

14. An optical display comprising the polarizing plate according to claim 12.

* * * * *